Sept. 16, 1924.

G. JACOBS 1,508,884

SIGNALING DEVICE

Filed Jan. 15, 1921        2 Sheets-Sheet 1

George Jacobs INVENTOR.

BY Edward N Pagelsen ATTORNEY.

Sept. 16, 1924.

G. JACOBS 1,508,884

SIGNALING DEVICE

Filed Jan. 15, 1921   2 Sheets-Sheet 2

INVENTOR.
George Jacobs,
BY
Edward N. Pagelsen
ATTORNEY.

Patented Sept. 16, 1924.

1,508,884

UNITED STATES PATENT OFFICE.

GEORGE JACOBS, OF DETROIT, MICHIGAN.

SIGNALING DEVICE.

Application filed January 15, 1921. Serial No. 437,518.

*To all whom it may concern:*

Be it known that I, GEORGE JACOBS, a citizen of the United States, and residing at Detroit, in the county of Wayne and State of Michigan, have invented a new and Improved Signaling Device, of which the following is a specification.

This invention relates to signals adapted to be mounted on the rear ends of motor vehicles, and its object is to provide a pair of electric light bulbs, preferably of different colors, and means for controlling the current to said bulbs so that they will indicate varying conditions of movement of the vehicle.

This invention consists in combination of a pair of light bulbs, one preferably green and the other red, of means positioned by the mechanism of the vehicle to indicate the speed at which the vehicle is moving, and means connected to the speed indicator for opening and closing the circuits to said light bulbs. It further consists in combination with such signaling device, of a pair of indicators in the form of light bulbs under the direct observation of the driver of the vehicle whereby the operation of the current controller may be observed. It also consists in the details of construction illustrated in the accompanying drawings and particularly pointed out in the claims.

Figure 1:
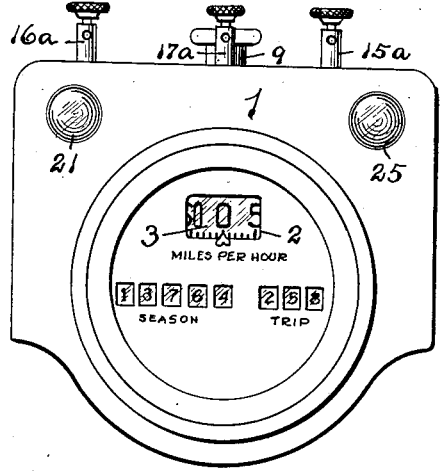
Figure 2:
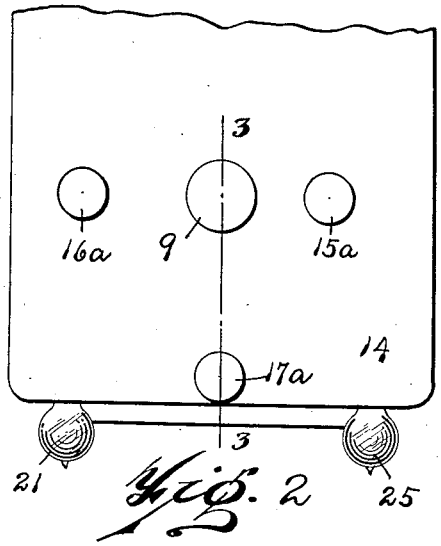
Figure 3:
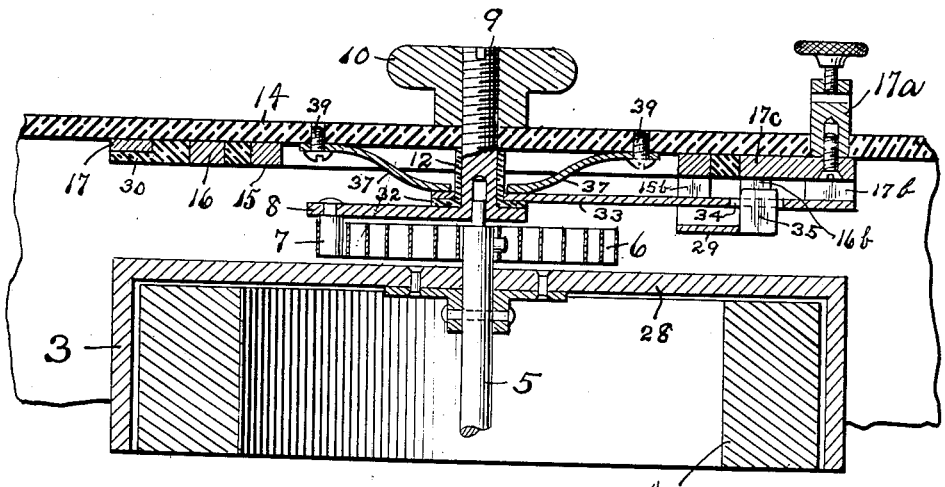
Figure 4:
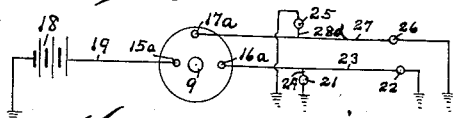
Figure 5:
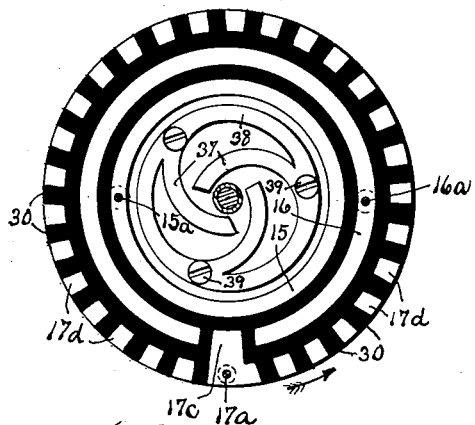
Figure 6:
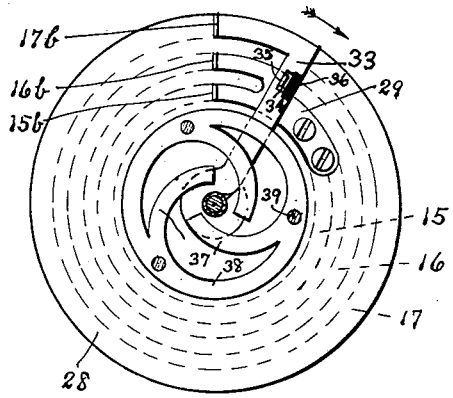
Figure 7:
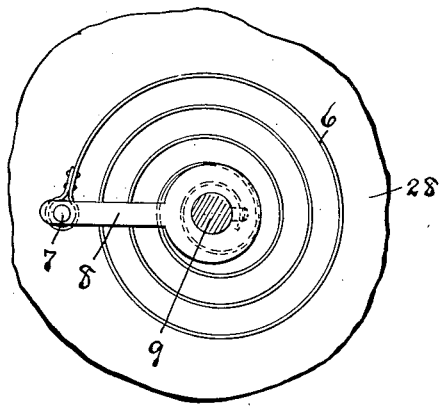
Figure 8:
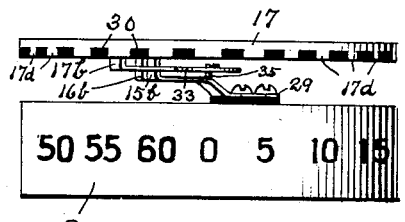
Figure 9:
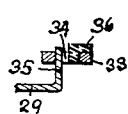

In the drawings, Fig. 1 is a front elevation of a speed indicator equipped with my improved current controlling mechanism. Fig. 2 is a plan thereof. Fig. 3 is a section on the line 3—3 of Fig. 2. Fig. 4 is a wiring diagram for this signal. Fig. 5 is a bottom plan of a contact plate. Fig. 6 is a plan of the switch contact mechanism. Fig. 7 is a plan of a spring used in the speed indicator. Fig. 8 is an elevation of the speed indicating drum and the contact disk. Fig. 9 is a section showing a connection between the two movable contact members.

Similar reference characters refer to like parts throughout the several views.

The case 1 shown in Fig. 1 is of well known construction and has a window 2 through which a drum 3, bearing speed indicating graduations, may be observed. It is to be understood that any other device may be employed which comprises a rotating member which is turned in proportion to the speed of the vehicle. In Fig. 3 I have shown a magnetic actuator 4 for the indicating drum and a vertical shaft 5 to support the indicating drum. A spring 6 is shown connected to this shaft 5 and to the pin 7 at the outer end of an arm 8 to which is attached a threaded stem 9, on whose upper end is a nut 10 by means of which the arm 8 may be drawn against the sleeve 12 and so locked in any desired position so that the normal or initial position of the indicator drum may be established. The several parts thus far mentioned are old and well known.

Secured to the lower side of the top 14 of the case 1, which top is preferably of insulating material, is the stationary contact device shown in Fig. 5, and consists of three contact rings, the inner ring 15 being entire, the intermediate ring 16 nearly so, and the outer ring 17 being made up of substantially evenly spaced contact points, these points and the rings 15 and 16 being separated by areas of insulating material having good wearing qualities, such as bakelite.

The binding posts $15^a$, $16^a$ and $17^a$ connect to these rings 15, 16 and 17 respectively, and as indicated in Fig. 4, the post $15^a$ connects to the current source 18 and the ground by means of the wire 19, the post $16^a$ connects to the grounded light bulbs 21 and 22 by means of the wires 23 and 24, the light bulbs being preferably green, while the post $17^a$ connects to the grounded light bulbs 25 and 26 by means of the wires 27 and $28^a$, these bulbs being preferably red. The intention is that when the vehicle is standing still, the bulbs 25 and 26 shall show a steady red light; that when the vehicle is in motion the bulbs 21 and 22 shall show a steady green light; and when the speed of the vehicle is decreasing the light bulbs 25 and 26 shall alternately go on and off. The bulbs 22 and 26 are preferably at the usual locations of tail lights on the vehicle and while the bulbs 21 and 25 may be at any desired point on the instrument board, I have shown them mounted in the front of the case 1 of the speed indicator. Any electrician may supply the proper wiring for these bulbs.

Secured to the top or head 28 of the speed indicating drum 3 and insulated there-from is a contact plate 29 having contact brushes 15ᵇ and 16ᵇ engaging the contact rings 15 and 16 except when the drum 3 is at zero and the vehicle is stationary. At this time the contact brush 16ᵇ is in engagement with the contact plate 17ᶜ shown in Fig. 5, which plate is a part of the ring 17 and extends into a notch in the ring 16. After the drum 3 is turned sufficiently because of the speed of the vehicle to carry these contacts in the direction of the arrow in Fig. 5 until the contact brush 16ᵇ engages the ring 16, the green light indicates movement of the vehicle.

As stated before, the contact ring is formed with contact points, numbered 17ᵈ in Figs. 5 and 8, separated by the insulation 30 but connected by the body of the ring 17. The rings 15, 16 and 17 are, however, insulated from each other. The connection between the ring 15 and the ring 17 is made as follows. Mounted on the flange 32 at the lower end of the sleeve 12 (Fig. 3) is a flat arm 33 having an upturned contact brush 17ᵇ and having a slot 34 into which extends a lip 35 on the contact plate 29. One side of this notch is covered by the insulation 36 as shown in Fig. 9. The hub of this arm is pressed against the flange 32 by the spring arms 37 united by a ring 38 which is attached to the top 14 of the case 1 by the screws 39.

When the speed-indicator drum turns in the direction of the arrow in Fig. 6 with increasing speed of the vehicle, the lip 35 presses against the block 36 of insulation on the arm 33 and carries this arm and its contact brush 17ᵇ around with it, but because of the insulation, there is no current to this arm and the contact points 17ᵈ.

When the speed decreases, the contact plate 29 and its lip 35 turn contrary to the arrow in Fig. 6, causing this lip to engage the opposite side of the slot 34 and therefore contact with the metal of this arm. The result is a closed circuit from the post 15ᵃ to the contact brush 17ᵇ and the points 17ᵈ and thus to the red light bulbs 25 and 26 as the contact brush 17ᵇ passes over these points 17ᵈ, the red tail light flashing on and off at each reduction of speed measured by a point 17ᵇ.

The diameter of the contact disk shown in Fig. 5 may be the same or may differ from that of the top 28 of the speed indicating drum, as may be desired, as this may be taken care of by the shape of the contact plate 29 and the length of the arm 33. It is evident that the small bulbs 21 and 25 may be omitted if desired and that this light control mechanism may operate equally well when the cylindrical part 3 of the speed indicator is omitted and merely the head 28 retained.

Many other changes of details may be omitted if desired without departing from the spirit of my invention as set forth in the following claims.

I claim:—

1. In a signaling device for vehicles, the combination of a support, a series of contacts arranged thereon insulated from each other, a movable contact adapted to move over said series of contacts according to the speed of the vehicle, said movable contact embodying a driving part connected to a current source and a driven part adapted to engage the series of contacts, one of said parts having a pair of stops adapted to be engaged by the other part, one of said stops providing electrical connection between said parts and the other being an insulator, so that current will pass to the series of contacts when the driving part moves the driven part in one direction.

2. In a signaling device for vehicles, the combination of stationary contact rings, and contact brushes in engagement therewith to transmit current from one to the other and adapted to turn according to the speed of the vehicle, one of said rings embodying a series of connected contact points and insulation between them, another of said rings being connected to a current source.

3. In a signaling device for vehicles, the combination of a support, a series of contacts arranged thereon insulated from each other, a movable contact adapted to move over said series of contacts according to the speed of the vehicle, said movable contact embodying a driving part connected to a current source and a driven part adapted to engage the series of contacts, one of said parts having a pair of stops adapted to be engaged by the other part, one of said stops providing electrical connection between said parts and the other being an insulator, so that current will pass to the series of contacts when the driving part moves the driven part in one direction, and a second stationary contact constantly engaged by the driving part of said contact.

4. In a signaling device for vehicles, the combination of three concentric stationary contact rings insulated from each other, the intermediate ring having a gap into which an extension on the outer ring projects, the inner ring being connected to a current source, a rotatable head adapted to be turned in accordance with the speed of the vehicle, a contact plate mounted thereon and having brushes, one in engagement with the inner ring and the second adapted to engage the intermediate ring when the head is turned and the inward extension on the outer ring when the vehicle is stationary and the head is in normal position.

5. In a signaling device for vehicles, the combination of three concentric stationary contact rings insulated from each other, the intermediate ring having a gap into which an extension on the outer ring projects, the inner ring being connected to a current source, a rotatable head adapted to be turned in accordance with the speed of the vehicle, a contact plate mounted thereon and having brushes, one in engagement with the inner ring and the second adapted to engage the intermediate ring when the head is turned and the inward extension on the outer ring when the vehicle is stationary and the head is in normal position, the outer contact ring consisting of alternating contact points and insulation, and an independent contact brush adapted to be moved over the contacts of the outer ring by said contact plate.

6. In a signaling device for vehicles, the combination of three concentric stationary contact rings insulated from each other, the intermediate ring having a gap into which an extension on the outer ring projects, the inner ring being connected to a current source, a rotatable head adapted to be turned in accordance with the speed of the vehicle, a contact plate mounted thereon and having brushes, one in engagement with the inner ring and the second adapted to engage the intermediate ring when the head is turned and the inward extension on the outer ring when the vehicle is stationary and the head is in normal position, the outer contact ring consisting of alternating contact points and insulation, and an independent contact brush adapted to be moved over the contacts of the outer ring by said contact plate, said independent contact brush and contact plate being in electrical engagement when moving in one direction and insulated from each other when moving in the opposite direction.

GEORGE JACOBS.